United States Patent [19]

Liere

[11] Patent Number: 4,953,454
[45] Date of Patent: Sep. 4, 1990

[54] STEAM CHAMBER

[76] Inventor: Merle V. Liere, R.R. 2, Colton, S. Dak. 57018

[21] Appl. No.: 280,929

[22] Filed: Dec. 7, 1988

[51] Int. Cl.⁵ .............................................. A23L 1/01
[52] U.S. Cl. ....................................... 99/426; 34/174
[58] Field of Search ................ 49/426, 471, 467, 516; 34/33, 165, 168, 174, 236, 37, 68, 167, 169, 170, 181, 182, 210, 209, 213, 214

[56] References Cited

U.S. PATENT DOCUMENTS

| 129,018 | 7/1982 | Fisher | 34/33 |
| 129,544 | 7/1972 | Fisher | 34/64 |
| 174,360 | 3/1876 | Gratiot | 34/174 |
| 199,690 | 1/1878 | Burkholder | 34/174 |
| 218,497 | 8/1879 | Daniels | 34/68 X |
| 245,602 | 8/1881 | Barton | 34/174 |
| 305,244 | 9/1884 | Sawin | 34/174 |
| 401,185 | 4/1889 | Littlefield | 34/168 |
| 484,099 | 10/1892 | Jewell | 209/10 |
| 493,225 | 3/1893 | Shamp | 34/174 |
| 527,442 | 10/1894 | McCallister | 34/174 |
| 534,030 | 2/1895 | Caine | 34/174 |
| 552,127 | 12/1895 | Howie | 34/168 |
| 558,065 | 4/1896 | Griess | 34/56 |
| 559,603 | 5/1896 | Quitzo | 34/56 |
| 571,638 | 11/1896 | Blackburn et al. | 34/167 |
| 578,523 | 3/1897 | Quitzo | 209/10 |
| 735,878 | 8/1983 | Hutton | 34/68 |
| 741,831 | 10/1903 | Provost | 34/174 X |
| 785,119 | 3/1905 | Provost | 34/168 |
| 971,559 | 10/1910 | Provost | 34/167 |
| 1,574,210 | 2/1926 | Spaulding | 34/37 X |
| 2,371,095 | 3/1945 | Woodward | 34/174 |
| 2,814,129 | 11/1957 | Daman | 34/68 |
| 2,945,687 | 7/1960 | Davis | 34/168 |
| 3,315,372 | 4/1967 | Nettle et al. | 34/168 |
| 3,721,018 | 3/1973 | Brandt et al. | 34/168 |

Primary Examiner—Harvey C. Hornsby
Assistant Examiner—Scott J. Haugland
Attorney, Agent, or Firm—Caesar, Rivise, Bernstein, Cohen & Pokotilow, Ltd.

[57] ABSTRACT

An apparatus is provided which is designed to be connected to a steam source for steaming materials therein. In particular, the apparatus is designed to steam treat raw soybeans with the hulls intact. The apparatus includes a chamber for receiving and passing the materials to be steamed therethrough which is partitioned to at least two substantially unobstructed vertical compartments. Steam pipes which are connected to the steam source are positioned adjacent the partition at spaced intervals between the top and the bottom of the chamber in order to deliver steam into each of the compartments within the chamber. In the preferred embodiment, the steam chamber includes an upper and lower chamber and the partition divides the upper chamber vertically into two side-by-side compartments. The upper chamber is twenty-thirty feet long or longer.

6 Claims, 2 Drawing Sheets

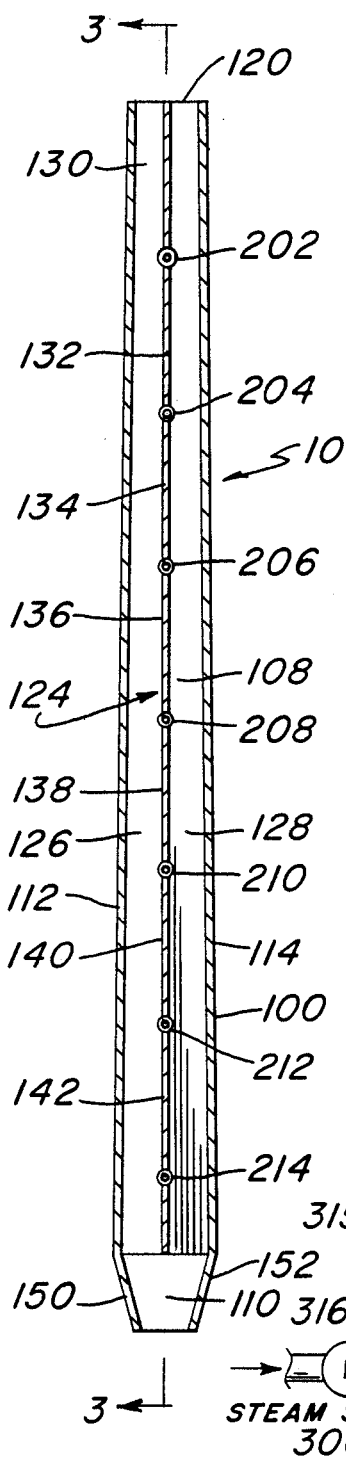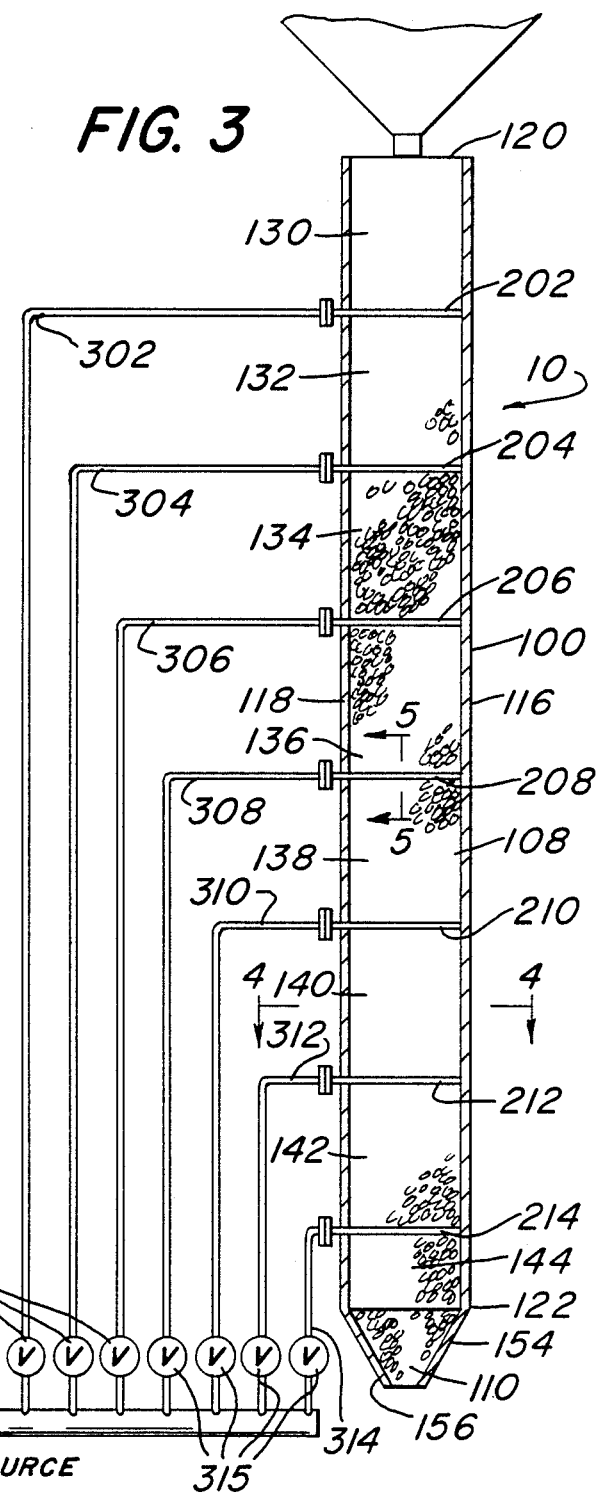

STEAM CHAMBER

Field of the Invention

The present invention relates to an apparatus for use in treating agricultural materials such as grains, seeds, and soybeans, and in particular, the invention relates to an apparatus for steam treating raw soybeans with hulls intact in order to break down proteolytic inhibiting substances in the soybeans.

BACKGROUND OF THE INVENTION

Soybeans are considered one of the optimum sources of supplemental protein fed to livestock today. Raw soybeans, however, cannot be fed to livestock and consequently, raw soybeans must be treated in order to make them suitable feed supplements. The reason soybeans cannot be fed in the raw state is because proteolytic inhibiting substances are present in the raw soybeans. The presence of these inhibiting substances requires that the raw soybeans be cooked or heated in order to destroy harmful urease enzymes and trypsin inhibitors. These substances in the raw soybeans have a retarding effect upon the growth of livestock and they can actually prevent proper utilization of the protein supplementation provided by the soybean feed material. Care must be taken in the heating process, however, because even though the heating is required to destroy the trypsin inhibitors, improper cooking will result in damage to the protein product itself.

If excessive heat is applied during the processing, the feeding value may be low because some of the amino acids will become unavailable for use in the feed product. If raw soybean is taken through a treating process and left undercooked, that is, not enough heat is applied, urease activity will be high and the trypsin inhibitors will not be destroyed.

Devices for heating or steaming grains, seeds, beans and other agricultural products including soybeans have been known for years. Indeed, some of the very earliest United States Patents are directed to steaming devices: Fisher, U.S. Pat. No. 129,018 (1872); Fisher, U.S. Pat. No. 129,544 (1872); Jewell, U.S. Pat. No. 484,099 (1892); Shamp, U.S. Pat. No. 493,225 (1893); Howie, U.S. Pat. No. 552,127 (1895); Griess, U.S. Pat. No. 558,065 (1896); Quitzo, U.S. Pat. No. 559,603 (1896); Blackburn et al., U.S. Pat. No. 571,638 (1896); Quitzo, U.S. Pat. No. 578,523 (1897); Provost, U.S. Pat. No. 785,119 (1905); Provost, U.S. Pat. No. 971,559 (1910); and more recently, Brandt et al., U.S. Pat. No. 3,721,018 (1973). A number of these patents, such as the two Fisher patents, the Blackburn et al. patent, and the Brandt patent include a steam chamber in which steam is provided into the chamber by means of a perforated pipe. In the Fisher U.S. Pat. No. '018 patent a steam coil is provided within a lower chamber and in the Fisher U.S. Pat. No. '544 patent, a coil of steam pipes is provided at the base of an elevated hopper. Both of the patents also disclose compartments which expand outwardly toward the bottom thereof. In Brandt et al. U.S. Pat. No. '018, a lower compartment well below the introduction of the steam is divided into a plurality of compartments which are inclined to form a tapering rectangluar gridwork or baffle to prevent channeling of the grain treated therein. These channels taper toward the bottom in conformity with the cross-sectional shape of the lower section. The other patents, such as Shamp U.S. Pat. No. '225 and Howie U.S. Pat. No. '127 provide steam through the walls of a chamber which contains the matter being treated. Blackburn et al. U.S. Pat. No. '638 injects steam through a plurality of steam pipes over which are positioned conical spreaders to disperse the material being treated. Provost U.S. Pat. No. '119 also provides a conical spreader for dispersing the material. The other patents also disclose various shapes and configurations of steaming apparatuses.

To this day, the configuration and operation of steaming chambers has changed very little from the steam chambers of nearly 100 years ago. Basically, steam chambers comprise single chambers with a plurality of pipes to inject steam into the chamber at one or more locations or steam is injected through the wall of the chamber. Diverter tents are typically positioned over the steam inlet pipes in order to divert the product being treated as well as prevent the product from clogging the steam pipes, and because grains such as corn and wheat do not have to be treated for any particularly long length of time, the lengths of the prior steam compartments are generally less than 10 feet.

Furthermore, because these prior steam chambers are designed for treatment of grain products which have no particularly stringent treatment requirements, they have not taken into consideration the very special requirements necessary for processing soybeans. One of these requirments is that the soybeans be heated for a required amount of the, oftentimes 45-60 minutes, to deactivate the various harmful protein inhibitors. Another requirement which is overlooked by these prior steam chambers is a requirement that the steam chamber remain essencially unobstructed or free of diverters and steam pipes for the processing of soybeans. These obstructions may not interfere with the steam treatment of certain smaller grains, but these obstructions cause channeling and disruption of uniform flow of soybeans passing therethrough. Soybeans have different flow characteristics which are easily disrupted by these obstructions. Oftentimes, obstructions such as tents over the steam pipes and the mere presence of the steam pipes interspersed throughout the steam chamber will cause the soybeans passing downward through the chamber to reverse their direction of flow and cause the soybeans to channel or become stalled in a swirling motion as a continuous path. When this happens, flow through the center of the chamber is disrupted and incoming soybeans will rush rapidly along the walls of the chamber and leave the chamber in far less than the time required to deactivate the harmful inhibitors.

Still further, many of the steam chambers which are currently available are designed for use only on a batch basis; that is, they are filled with product, steam is injected and all of the steamed product is removed prior to introduction of another supply of product to be treated. The concept of an apparatus for continuous steam treatment of a soybean product does not seem to have been developed.

OBJECTS OF THE INVENTION

In view of the above considerations and with this background in mind, it is an object of the present invention to provide an improved steaming apparatus for the treatment of agricultural materials such as grains, seeds, beans and in particular, soybeans with the hulls intact.

It is a further object of the invention to provide a steam chamber for agricultural materials, and in particular soybeans, which is operable on a continuous basis.

It is another object of the present invention to provide a steam chamber which has a plurality of steam treating chambers in order to accelerate and enhance the efficiency of the steam treating process.

It is yet another object of the invention to provide a vertical steam treating chamber which has a plurality of steam outlets along the length thereof, each outlet being positioned within the chamber and between opposite side walls of the steam treating chamber and which only minimally obstructs the chamber.

It is another object of the invention to provide a vertical steam chamber which has a vertical length longer than steam chambers currently available in order to treat a greater tonnage of materials in a shorter period of time.

It is also an object of the invention to provide a steam chamber which increases in width along the length thereof to accommodate the expansion of the materials being steam-treated.

It is a further object of the invention to provide a steam chamber wherein tents or baffles are not required over the steam outlets in order to disperse the product being treated or to keep the product being treated from clogging the steam pipe outlets.

SUMMARY OF THE INVENTION

In furtherance of these objectives, an apparatus is provided which is designed to be connected to a steam source for steaming materials therein. This apparatus includes a chamber for receiving and passing the materials to be steamed therethrough which is partitioned into at least two vertical compartments. Steam pipes which are connected to the steam source are positioned adjacent the partition at spaced intervals between the top and the bottom of the chamber in order to deliver steam into each of the compartments within the chamber. In the preferred embodiment, the steam chamber includes an upper chamber and a lower chamber and the partition divides the upper chamber vertically into two side-by-side compartments. The upper chamber is, twenty—thirty feet long or longer.

BRIEF DESCRIPTION OF THE DRAWINGS

Other objects and many of the attendant advantages of the instant invention will be readily appreciated as the same becomes better understood by reference to the following detailed description when considered in conjunction with the accompanying drawings, wherein:

FIG. 2 is a section view of the steam chamber of the present invention taken along line 2—2 in FIG. 1.

FIG. 3 is a section view of the steam chamber of the present invention taken along line 3—3 in FIG. 2, and showing the steam connections.

DETAILED DESCRIPTION OF THE INVENTION

Figure 1:
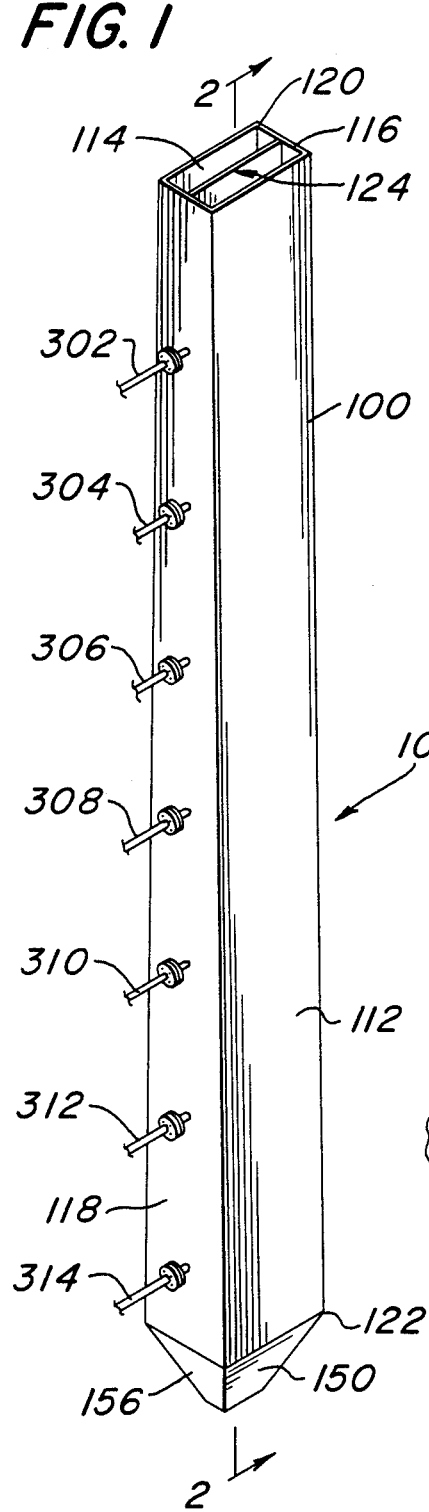
FIG. 1 is an isometric view of the steam chamber according to the present invention.

Now referring in greater detail to the various figures of the drawings wherein like reference characters refer to like parts, a preferred embodiment of the steam treating apparatus of the present invention is shown generally at 10 in FIG. 1. The steam treating apparatus of the invention comprises a chamber 100 with steam pipes 200 therein which are adapted to be connected to a steam source 300.

The steam chamber 100 includes an upper chamber 108 and a lower chamber 110. Each chamber has four walls. Two side walls 112, 114 of the upper chamber 108 are rectangular in shape and identical in dimension. The front and back walls 116, 118 of the upper chamber are trapezoidal in shape, are identical in dimension and increase in width from top to bottom. The trapezoidal shape of the front and back walls 116, 118 results in a chamber which increases in width from the top 120 thereof to the bottom 122. The depth of the upper chamber 108, however, remains constant at the width of the rectangular side walls 112, 114.

Extending lengthwise through the upper chamber 108 is a dividing partition 124 between the front and back walls 116, 118 and between the top 120 and the bottom 122 of the chamber. This dividing wall 124 divides the upper chamber 108 into two vertical compartments 126, 128. The upper chamber 108 is open at the top 120 thereof above both compartments 126, 128.

Positioned along the length of the upper chamber 108 and extending between the front and back walls 116, 118 are a plurality of parallel pipes 202-214 through which steam is injected into the two compartments 126, 128. As also shown in FIG. 2, in the preferred embodiment, the dividing partition 124 is comprised of a plurality of plates 130-142 welded to the front and back walls with one of the steam pipes 202-214 positioned between each of the plates. The plates 130-142 are welded to the adjacent steam pipes as well (FIG. 5).

Figure 5:
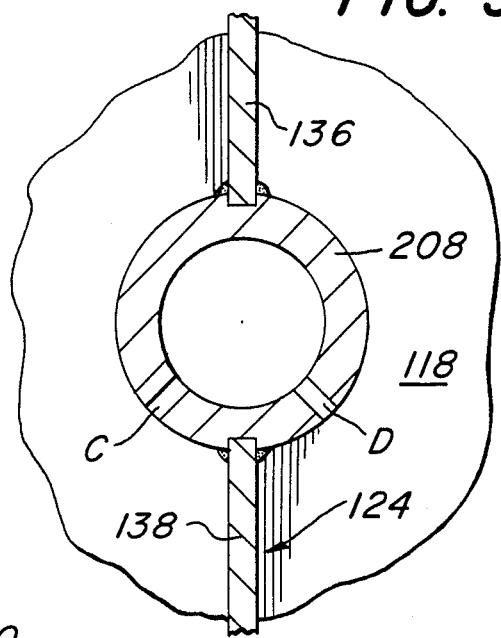
FIG. 5 is a section view of a steam pipe of the present invention taken along line 5—5 in FIG. 3.
Figure 6:
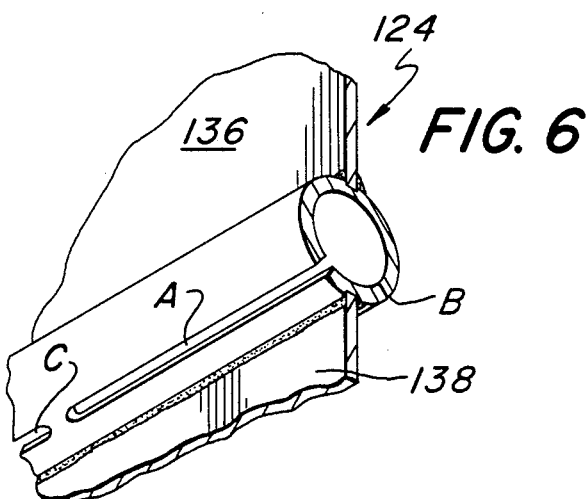
FIG. 6 is a sectioned, isometric view of a steam pipe of the present invention.
Figure 4:
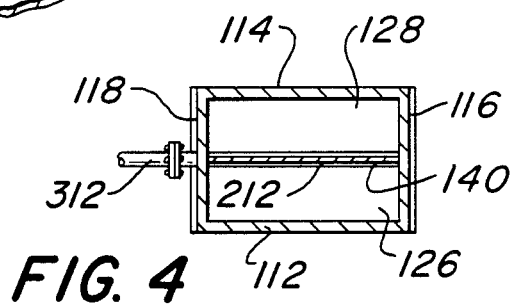
FIG. 4 is a section view of the steam chamber of the present invention taken along line 4—4 in FIG. 3.

Each of the pipes 202-214 is provided with a plurality of open slots A-D therethrough (FIGS. 5 and 6). The slots are positioned in the pipes so that the slots open opposite the direction of flow of the material moving down from the top to the bottom of the upper chamber 108. The slots A-D in each pipe are also positioned with at least one slot located on each side of the partition 124 so that each pipe 202-214 delivers steam into each of the compartments 126, 128 in the chamber 108.

The pipes 202-214 are preferably made of stainless steel and project through the back wall 118 of the upper chamber where they can be connected to an appropriate steam source 300. As shown in FIGS. 1 and 3, a plurality of supply pipes 302-314 are connected to the steam pipes 202-214, respectively, in order to provide steam into the upper chamber 108. Each of the steam supply pipes 302-314 has a control valve 315 therein and a master valve 316 is provided to control total steam flow to all of the individual pipes 302-314.

The lower chamber 110, unlike the upper chamber 108, converges from the top, which begins at the bottom 122 of the upper chamber 108, to the bottom thereof. The side walls 150, 152 are rectangular and the same width as the upper side walls 112, 114. The front and back walls 154, 156 of the lower chamber 110 are trapezoidal, decreasing in width along the vertical length thereof. The lower chamber 110 is hollow, without any dividing partitions or steam pipes.

Like the steam pipes, the walls of the upper and lower chambers and the dividing partition are made of steel, with 12 gauge stainless steel being preferred.

When the steaming chamber is in use, raw materials, such as the preferred raw soybeans with hulls intact, are supplied directly into the open top 120 of the upper chamber 108 and allowed to fall under the pull of gravity into the two compartments 126, 128. As the materials fall through the two compartments 126, 128, steam from the steam pipes 202–214 is directed into each compartment through the slots A–D in the pipes on both sides of the partition 124. The steam causes the material passing through the compartments to heat and to swell as a result of absorption of moisture from the steam. Because the upper chamber increases in width toward the bottom thereof, there is ample room for the expanded material to continue its movement downward through the upper chamber.

In the earlier discussion, it was pointed out that one of the important reasons for heat treating materials such as soybeans is to deactivate harmful inhibitors which compromise the full nutritional value of the material. By using the steaming apparatus described herein, the necessary steam treatment of the soybeans is enhanced significantly. No longer is it necessary to batch-treat the materials in a closed chamber. Using the present invention, steam treatment can be achieved on a continuous basis. By positioning the steam outlets next to the dividing partition, it is also possible to forego the requirement of diverters over the pipes and a substantially unobstructed chamber is provided.

An important factor in achieving this continuous steam treatment is to provide a steam chamber which is significantly longer than any steam chamber which is currently available. In the preferred embodiment shown in FIG. 3, the upper chamber 108 is 30 feet long from the open top 120 to the bottom 122 which joins to the lower compartment 110. Between each of the steam pipes 202–214, is a plate (130–142) four feet high and three feet wide, the width of the side walls 112, 114. The bottommost plate 144 is two feet high and three feet wide. The opening 124 at the top of the upper chamber 108 is twenty inches by thirty-six inches, thus making the front and back walls 116, 118 twenty inches wide at the top. The bottom 122 of the upper chamber is twenty-eight inches by thirty-six inches. Therefore, the front and back walls expand from twenty inches at the top to twenty-eight inches at the bottom.

The length of the chamber affects the treatment process in several ways. First of all, by providing a chamber of sufficient length (here, a minimum of 20–30 feet) the soybeans will remain under steam treatment conditions (with steam at at least 220° F) for the desirable 45–60 minutes treatment time, since it will take the raw soybeans with the hulls intact 45–60 to move from the top of the upper chamber to the bottom of the upper chamber.

The bottom opening of the lower chamber 110 is fifteen inches wide, the lower chamber 110 tapering from twenty-eight inches at the top to fifteen inches at the bottom. The dividing partition 124 is positioned down the center axis of the upper chamber 108, and each of the two compartments 126, 128 is half the size of the overall dimensions of the upper chamber.

The steam pipes 202–214 are longer than thirty-six inches so that they extend from the front wall through the back wall 118 where they connect to steam supply pipes 302–314, respectively. The pipes 202–214 are preferably one inch in outside diameter, and the slots A–D in each pipe are at least eight inches long.

In a typical construction of the steam chamber of the present invention having the dimensions as described with an upper chamber 108 thirty feet long divided into two compartments, and providing steam for treatment at at least 220° F, if the desired treatment time is 45 minutes, the chamber can handle 5 tons per hour. On the other hand if one hour of treatment is required, the chamber can still process approximately 4 tons per hour.

Without further elaboration the foregoing will so fully illustrate my invention that others may, by applying current or future knowledge, adopt the same for use under various conditions of service.

What I claim as the invention is:

1. An apparatus adapted to be connected to a steam source for steaming materials therein, said apparatus comprising:
   chamber means for receiving and passing therethrough said material to be steamed, said chamber means being comprised of an upper chamber and a lower chamber, said upper chamber having a top and a bottom and being wider at said bottom than at said top;
   planar partitioning means within said upper chamber for partitioning said upper chamber into at least two compartments, said compartments being substantially unobstructed an increasing in cross sectional area along the length thereof; and
   steam means adapted to be connected to said steam source and positioned at spaced intervals between said top and said bottom of said upper chamber for delivering steam into said compartments within said upper chamber.

2. An apparatus as claimed in claim 1, wherein:
   said partitioning means is comprised of a plurality of planar plates aligned and spaced form each other vertically within said upper chamber; and
   said steam delivery means is comprised of a plurality of steam pipes positioned in the space between said planar plates.

3. An apparatus as claimed in claim 2, wherein said steam pipes have at least one opening therethrough in each of said compartments, said openings facing toward the bottom of said chamber means.

4. An apparatus as claimed in claim 1, wherein:
   said lower chamber has a top and a bottom, the top of said lower chamber adjoining the bottom of said upper chamber and said lower chamber being wider at the top than at the bottom thereof.

5. An apparatus as claimed in claim 1, wherein said upper chamber is at least twenty feet long.

6. An apparatus adapted to be connected to a steam source for steam treating raw soybeans having the hulls intact, said apparatus comprising:
   chamber means for receiving and passing therethrough said soybeans to be steamed, said chamber means having top and bottom openings and the width of said chamber means increasing along at least a portion of the distance from the top to the bottom thereof;
   planar partitioning means within said chamber means for partitioning said chamber means into at least two substantially unobstructed compartments; and
   steam means adapted to be connected to said steam source and positioned at spaced intervals between the top and bottom of said chamber means for delivering steam into said compartments within said chamber means, said steam means within said chamber means being positioned to leave said compartments substantially unobstructed.

* * * * *